(12) United States Patent
Lee et al.

(10) Patent No.: US 9,081,132 B2
(45) Date of Patent: Jul. 14, 2015

(54) ADHESIVE FILM FOR A REFLECTION SHEET AND REFLECTION SHEET USING THE SAME

(75) Inventors: Sang Hoon Lee, Gumi-si (KR); Mun Bok Lee, Gumi-si (KR); Chang Ik Hwang, Daegu (KR); Sang Pil Kim, Gumi-si (KR)

(73) Assignee: Toray Advanced Materials Korea Inc. (KR)

( * ) Notice: Subject to any disclaimer, the term of this patent is extended or adjusted under 35 U.S.C. 154(b) by 71 days.

(21) Appl. No.: 13/982,570

(22) PCT Filed: Dec. 28, 2011

(86) PCT No.: PCT/KR2011/010190
§ 371 (c)(1),
(2), (4) Date: Sep. 13, 2013

(87) PCT Pub. No.: WO2012/105755
PCT Pub. Date: Aug. 9, 2012

(65) Prior Publication Data
US 2013/0342925 A1    Dec. 26, 2013

(30) Foreign Application Priority Data

Feb. 1, 2011    (KR) .......................... 10-2011-0010279

(51) Int. Cl.
| | |
|---|---|
| *B32B 7/12* | (2006.01) |
| *G02B 5/08* | (2006.01) |
| *C09J 7/02* | (2006.01) |
| *C09J 183/04* | (2006.01) |
| *G02B 5/00* | (2006.01) |
| *C09J 133/06* | (2006.01) |
| *C09J 133/08* | (2006.01) |
| *C09J 183/06* | (2006.01) |
| *C09D 175/04* | (2006.01) |

(52) U.S. Cl.
CPC ... *G02B 5/08* (2013.01); *C09J 7/02* (2013.01); *C09J 7/0292* (2013.01); *C09J 7/0296* (2013.01); *C09J 133/066* (2013.01); *C09J 133/08* (2013.01); *C09J 183/04* (2013.01); *C09J 183/06* (2013.01); *G02B 5/00* (2013.01); *C09D 175/04* (2013.01); *Y10T 428/24521* (2015.01); *Y10T 428/2848* (2015.01)

(58) Field of Classification Search
CPC ............ B32B 27/32; B32B 2264/0285; B32B 3362/0284; B32B 27/08; C08J 5/18
USPC ......... 359/601, 838; 428/1.55, 220, 332, 343, 428/354, 480, 483; 425/355 AC; 136/256, 136/252
See application file for complete search history.

(56) References Cited

U.S. PATENT DOCUMENTS

| | | | |
|---|---|---|---|
| 2003/0068491 | A1* | 4/2003 | Otaki et al. .................... 428/343 |
| 2004/0071962 | A1* | 4/2004 | Tanimoto ....................... 428/343 |
| 2010/0275980 | A1* | 11/2010 | Karpinski et al. ............ 136/252 |

FOREIGN PATENT DOCUMENTS

| | | |
|---|---|---|
| JP | H04-239540 | 8/1992 |
| JP | 2003-036729 | 2/2003 |
| JP | 2003036729 | * 2/2003 |
| JP | 2008-158134 | 7/2008 |
| KR | 10-2006-0057645 | 5/2006 |
| KR | 10-2008-0029041 | 4/2008 |
| KR | 2008-0051311 | 6/2008 |

* cited by examiner

*Primary Examiner* — Darryl J Collins
*Assistant Examiner* — Journey Sumlar
(74) *Attorney, Agent, or Firm* — D. Peter Hochberg; Sean F. Mellino

(57) ABSTRACT

An adhesive film for a reflection sheet and a reflection sheet using the adhesive film is provided. The adhesive film comprises a plastic base film having a heat shrinkage of −0.1 to 0.5% at 150° C. in machine and transverse directions; an adhesive layer formed on one side of the base film by applying an adhesive composition; and an anchor coating layer formed on the other side of the base film, opposite to the side on which the adhesive layer is formed. The adhesive film for a reflection sheet according to the present invention is manufactured by applying an adhesive composition on a plastic base film where heat shrinkage is controlled. Thus, the adhesive film has superior dimensional stability at a high temperature and excellent workability in a post process for laminating a reflection layer. Partial detachment does not occur when an adhesive layer is detached from an adherent, and stable physical properties can be achieved.

6 Claims, No Drawings

ADHESIVE FILM FOR A REFLECTION SHEET AND REFLECTION SHEET USING THE SAME

CROSS-REFERENCE TO RELATED APPLICATIONS

This application is a National Stage application of International Application No. PCT/KR2011/010190, filed on Dec. 28, 2011, which claims priority of Korean application Serial Number 10-2011-0010279 filed on Feb. 1, 2011, which are incorporated herein by reference in their entireties.

BACKGROUND OF THE INVENTION

1. Field of the Invention

The present invention relates to an adhesive film for a reflection sheet and the reflection sheet using the same. More specifically, the present invention relates to an adhesive film for a reflection sheet and the reflection sheet using the same, in which the adhesive film is manufactured using a plastic base film where heat shrinkage is controlled and thus has superior dimensional stability at a high temperature and excellent workability in a post process for laminating reflection layer, and thus partial detachment of adhesive layer does not occur when the adhesive layer is detached from the adherent, and stable physical properties can be achieved.

2. Background of the Related Art

Owing to the convenience for use, the acrylic adhesives are widely used in industrial fields including advertisement adhesive sheets, reflection sheets, industrial protection films, optical adhesive sheets, adhesive tapes for electronic parts, and the like. And their utilization is spread to as far as display optical films and semiconductor sectors as IT industry is growing-up recently.

Generally, an adhesive film is manufactured by forming an adhesive layer on a release film or a release sheet by coating an adhesive thereon, drying and laminating the adhesive layer on a base film such as a polyethylene terephthalate film. In some cases, the base film may be a pre-processed one depending on its usage.

Possible pre-processing are printing on the base film, or stacking two or more base film, and so on.

Particularly, optical films of various usages are used in flat panel displays (FPD) recently, and such a film has a simply stacked structure or a structure bonded using an adhesive, which includes a panel and a light source. Among the flat panel displays, liquid crystal displays (LCD) have advantages such as thinness, lightness, and low power consumption, and thus they are widely used in various fields including PCs, cellular phones, navigators, TVs, monitors, and the like.

The LCD generally includes a liquid crystal panel, a backlight unit (BLU), and a driving circuit unit for driving the liquid crystal panel. A light source used in the backlight unit may be a Cold Cathode Fluorescence Lamp (CCFL), an External Electrode Fluorescent Lamp (EEFL), a Light Emitting Diode (LED), a Flat Fluorescence Lamp (FFL), and the like, and the backlight unit is divided into an edge type and a direct type depending on the position of the light source. An edge type backlight unit has a light source installed at one end of the LCD and radiates light beams entering from the light source on the liquid crystal panel through a light guide plate and a plurality of optical sheets, whereas a direct type backlight unit arranges a plurality of light sources just below the LCD and radiates light beams entering from the light sources on the liquid crystal panel through a diffusion plate and a plurality of optical sheets.

In order to develop a backlight unit of high luminance, basically, the number of lamps or the driving power of a lamp increases. If the number of lamps or driving power of a lamp increases, temperature of the backlight unit also increases, and thus temperature of the LCD itself increases as a result, which causes malfunctions and failures of various circuit elements. In addition, since large surface LCDs and high performance displays are required, reflection films of high reflectance are demanded in order to improve performance of the backlight unit by supplying light beams to the liquid crystal as much as possible.

As an example of the reflection film, patent document 1 discloses a technique for obtaining a reflection plate having an excellent optical reflectance, which is made of polyester resin containing 2 to 25% by weight of polyolefin, and made by supplying the resin composition into an extruder, pressing the composition into the shape of a sheet, stretching the obtained sheet biaxially to form fine micro voids in the film. However, since the reflection plate is stretched as described above, its thermo-formability is degraded.

In addition, as an example of another conventional technique, patent document 2 discloses a reflection film manufactured by forming a pretreatment film on a surface of PET film, forming a micro-undulated surface by performing corona-discharge on the surface of the pretreatment film, forming a silver film on the micro-undulated surface using a liquid phase injection type deposition method, forming a discoloration preventing film on the silver film to protect the silver film, and forming a protection film on the discoloration preventing film. However, the reflection film may be deformed due to high temperature of the backlight, and thus the reflection characteristic can be degraded. If an adhesive process is performed on a silver reflection film in order to improve the reflection characteristic, the surface of the reflection film may be weak to scratch, and a curing process is required for a certain period of time at room or a high temperature before the reflection film is laminated on the adherent.

Therefore, inventors of the present invention have made an effort to solve the problems of the conventional technique and come to a conclusion that if an adhesive film is manufactured using a plastic base film where heat shrinkage is minimized, it is possible to obtain a reflection sheet without curing after post process for laminating reflection layer such as wet coating, deposition, printing or the like on the back side of the base film. And inventors also found that in case of using the minimized heat-shrinkage adhesive film, multiple attaching/releasing of reflection sheet to/from adherent can be possible and thus the present invention has been made as a result.

PRIOR ARTS (Patent document 1) Japanese Laid-Opened Patent No. Hei4-239540
(Patent document 2) Korean Laid-Opened Patent No. 2008-0051311

SUMMARY OF THE INVENTION

Accordingly, the present invention has been made in view of the above-mentioned problems occurring in the prior art, and it is an object of the present invention to provide an adhesive film for a reflection, in which the adhesive film has superior dimensional stability at a high temperature and excellent workability in a post process for laminating a reflection layer, and thus partial detachment does not occur when an adhesive layer is detached from adherent, and stable physical properties can be achieved.

It is another object of the present invention to provide a reflection sheet using the adhesive film.

To accomplish the above objects, according to an aspect of the present invention, there is provided an adhesive film for a reflection sheet, the adhesive film comprising: a plastic base film having a heat shrinkage of −0.1 to 0.5% at 150° C. in machine direction and transverse direction; an adhesive layer formed on one side of the base film by applying an adhesive composition; and an anchor coating layer formed on the other side of the base film, opposite to the side on which the adhesive layer is formed.

A thickness deviation of the base film is preferably less than 2.0 μm.

A raw material of the plastic base film may be any one selected from the group consisting of polyethylene, polypropylene, polystyrene, polyvinyl chloride, polychlorobiphenyl, polyethylene terephthalate, polyvinyl alcohol, polycarbonate, polybutylene terephthalate, polyethylene naphthalate, polyamide, polyacetal, polyphenylene ether, polyamid imide, polyether imide, polyether etherketone, polyimides, polytetra fluoroethylene, liquid crystal polymer, fluorocarbon resin, and a copolymer and a mixture of these.

The adhesive layer is preferably formed by applying one or more adhesives selected from the group consisting of silicon-based resin and acrylic resin.

A dynamic storage modulus of the adhesive layer is preferably $10^5$ to $10^7$ Pa.

The anchor coating layer is preferably formed of a resin composition containing one or more selected from the group consisting of amino-based resin, aminoalkyd-based resin, acrylic resin, styrenic resin, acryl-styrenic copolymer, polyester-based resin, vinyl chloride-based resin, polyvinyl acetate-based resin, polyvinyl butyral, urethane-based resin, urea-based resin, melamine-based resin, urea-melamine-based resin, epoxy-based resin, fluoro-polymer resin, polycarbonate, nitrocellulose, cellulose acetate, alkyd-based resin, rosin modified maleic acid resin, and polyamide-based resin.

To accomplish the above objects, according to another aspect of the present invention, there is provided a reflection sheet comprising: a plastic base film having a heat shrinkage of −0.1 to 0.5% at 150° C. in machine and transverse directions; an adhesive layer formed on one side of the base film by applying an adhesive composition; an anchor coating layer formed on the other side of the base film, opposite to the side on which the adhesive layer is formed; and a metal thin film layer formed on the anchor coating layer.

BRIEF DESCRIPTION OF THE DRAWINGS

Detailed Description of the Preferred Embodiment

Hereinafter, an adhesive film for a reflection sheet of the present invention will be described in detail.

The adhesive film for a reflection sheet of the present invention includes a plastic base film; an adhesive layer formed by applying an adhesive composition on one side of the base film; and an anchor coating layer formed on the other side of the base film, opposite to the side where the adhesive layer is formed.

The plastic base film applied to the present invention is controlled to have a heat shrinkage of −0.1 to 0.5% at 150° C. in the machine and transverse directions and a thickness deviation of less than 2 μm. If the heat shrinkage deviates from the range of −0.1 to 0.5%, the plastic base film may be deformed due to the heat generated in the process of manufacturing the reflection sheet.

The thickness deviation of the base film is preferably less than 2 μm. If the thickness deviation of the base film exceeds 2 μm, uniformity of the reflection characteristic may be lowered in the post process for laminating a reflection layer due to uneven coating thickness, and thus this is undesirable.

The type of the plastic base film is not specially limited, and it is sufficient if the heat shrinkage can be controlled within the range of −0.1 to 0.5% at 150° C. as described above. For example, polyethylene, polypropylene, polystyrene, polyvinyl chloride, polychlorobiphenyl, polyethylene terephthalate, polyvinyl alcohol, polycarbonate, polybutylene terephthalate, polyethylene naphthalate, polyamide, polyacetal, polyphenylene ether, polyamid imide, polyether imide, polyether etherketone, polyimides, polytetra fluoroethylene, liquid crystal polymer, fluorocarbon resin, or a copolymer or mixture of these may be used as the plastic base film. If the base film is a PET film, the heat shrinkage of −0.1 to 0.5% range may be obtained by performing heat treatment on a biaxially drawn film at 100 to 180° C., preferably at 120 to 150° C. Although the shrinkage is shown only for the PET film as an example in the embodiments of the present invention, adjustment of shrinkage through heat treatment like this may be performed for the other resins in a similar manner.

A film having a thickness of 10 to 500 μm is generally used as the plastic base film, which is used as the base of the adhesive film for a reflection sheet, preferably, a film having a thickness of 10 to 250 μm, further preferably 30 to 250 μm, is used. If thickness of the base film is less than 10 μm, strength is too low, and thus the base film does not have supportability as a base, whereas if the thickness exceeds 250 μm, the strength is too high, and thus the base film does not obtain workability.

In the adhesive film for a reflection sheet of the present invention, an adhesive layer formed by applying an adhesive composition is stacked on one side of the base film. In the present invention, the adhesive layer is stacked between the base film and a release film, and thickness of the adhesive layer is not specially limited, so, may be variable depending on the type of an adherent to which the adhesive film is applied or the adhesive strength required. A silicon-based or acrylic resin is preferable as a material for forming the adhesive layer. Generally, the silicon-based resin has superior heat resistance compared with the acrylic resin.

In case of the acrylic resin, a high molecular weight and a high degree of cure is preferable in order to grant heat resistance. The acrylic resin is, for example, any one or more selected from the group consisting of methyl acrylate, ethyl acrylate, n-propyl acrylate, isopropyl acrylate, n-propyl acrylate, n-butyl acrylate, isobutyl acrylate, hexyl acrylate, n-octyl acrylate, n-octyl methacrylate, isooctyl acrylate, isononyl acrylate, isoamyl acrylate, n-decyl acrylate, isodecyl acrylate, isodecyl methacrylate, isobornyl acrylate, 4-methyl 2-pentyl acrylate, and dodecyl acrylate. In addition, the acrylic resin may include a vinyl compound monomer. A vinyl compound monomer containing any one or more selected from the functional group consisting of a carboxyl group, a hydroxyl group, an epoxy group, an amide group, an amino group, a methylol group, a sulfonic acid group, a sulfamic acid group, and a phosphates (or phosphites) group may be appropriately used. The vinyl compound monomer containing a carboxyl group is any one or more selected from the group consisting of (metha)acrylic acid, crotonic acid, fumaric acid, maleic acid, itaconic acid, and glutaconic acid. The vinyl compound monomer containing a hydroxyl group is any one or more selected from the group consisting of 2-hydroxy ethyl(metha) acrylate, 2-hydroxy butyl(metha) acrylate, 4-hydroxy ethyl(metha) acrylate, and 4-hydroxy butyl(metha) acrylate.

A general application method in the art, such as a gravure coating method, a blade coating method, a wire bar coating method, a reverse coating method, a comma coating method or the like, may be used for applying the adhesive layer on the base film. A dynamic storage modulus of the adhesive layer is preferably $10^5$ to $10^7$ Pa. If the dynamic storage modulus of the adhesive layer is less than $10^5$ Pa, adhesion of the adhesive layer is insufficient, and thus the adhesive layer may be transferred when the adhesive layer is detached, whereas if the dynamic storage modulus of the adhesive layer exceeds $10^7$ Pa, adhesive strength between the adhesive layer and the surface of the adherent is lowered, and thus it is undesirable.

Meanwhile, a release film may be attached on the adhesive layer for the convenience of process or storage. The release film is temporarily attached in order to prevent contamination of the exposed surface of the adhesive layer until the adhesive layer is practically used and prevents contact to the adhesive layer in a normal handling state. Accordingly, the adhesive film may be managed and applied in a rolled state in the process of mass production. A variety of materials, such as a sheet of plastic film, rubber sheet, paper, cloth, non-woven fabric and the like coated with an appropriate release agent such as silicon-based, long chain alkyl-based, or fluorine-based release agent or molybdenum sulphide as needed, can be used as the release film.

The adhesive film for a reflection sheet of the present invention has an anchor coating layer in order to grant adhesive strength with a coating adhesive layer when a post-treatment is performed on the adhesive film. The anchor coating layer is formed on a side of the base film opposite to adhesive layer. It is preferable that the anchor coating layer has superior transparency. The anchor coating layer is installed in order to form irregularities of a certain range on the surface of a layer, prevent yellowing of a metal thin film layer, especially, a silver deposition layer, or improve deposition ability. The composition of anchor coating layer varies depending on the type and characteristics of the coating layer at the time of post-treatment. The anchor coating layer may be a composition comprising thermoplastic resin, thermal curing resin, electron beam curing resin, ultraviolet curing resin and the like. Specifically, the anchor coating layer may be a resin composition comprising a single or a mixture of amino-based resin, aminoalkyd-based resin, acrylic resin, styrenic resin, acryl-styrenic copolymer, polyester-based resin, vinyl chloride-based resin, polyvinyl acetate-based resin, polyvinyl butyral, urethane-based resin, urea-based resin, melamine-based resin, urea-melamine-based resin, epoxy-based resin, fluoro-polymer resin, polycarbonate, nitrocellulose, cellulose acetate, alkyd-based resin, rosin modified maleic acid resin, polyamide-based resin, and the like. Such a resin composition may be formed by dispersing the resin to a solvent such as water, dissolving agent, or the like. In addition, a plasticizer, a stabilizer, an ultraviolet ray absorbent, and the like may be added as needed. Common solvent used for painting may be used as the dissolving agent.

In the reflection sheet of the present invention, a metal thin film layer is stacked on one side of the adhesive sheet, specifically, on one side opposite to the side where the adhesive layer is formed. That is, the reflection sheet of the present invention includes a plastic base film; an adhesive layer formed by applying an adhesive composition on one side of the base film; and a metal thin film layer formed on the other side of the base film, opposite to the side where the adhesive layer is formed. At this point, an anchor coating layer may be additionally formed between the base film and the metal thin film layer.

The metal thin film layer may be formed by coating or depositing a metal, for example, through a liquid phase coating method, a vacuum deposition method, an ionized deposition method, a sputtering method, an ion plating method, or the like. A material having a high reflectance can be used as a material of the metal thin film layer. Generally, silver, aluminum or the like is preferable, and particularly, the silver is further preferable among these. In addition, although the metal thin film layer may be a single layered or multilayered laminate of metal or metal oxide; or multilayered laminate comprising metal layer and metal oxide layer. Thickness of the metal thin film layer varies depending on the material or method for forming the layer. Generally, the thickness is preferably within in a range of 10 to 300 nm, and further preferably, in a range of 20 to 200 nm. If the thickness of the metal thin film layer is 10 nm or more, a sufficient reflectance is obtained, whereas if the thickness of the metal thin film layer is 300 nm or more, additional improvement of the reflectance does not appear, and manufacturing efficiency is lowered, and thus it is undesirable.

Meanwhile, when the adhesive layer is formed on one side of the base film and the anchor coating layer is formed on the other side, the order of forming each layer is not specially limited. That is, the adhesive layer may be formed first on one side of the base film first, or the adhesive layer may be formed on the other side after the anchor coating layer is formed. Although the metal thin film layer of the present invention may be formed on the base layer through metal deposition, it is possible to previously manufacture a film formed with a metal thin film layer and then stack the film on the base layer. As a method of stacking the base layer and the metal thin film layer of the manufactured film, they may be simply piled up or may be piled up and then partially or entirely bonded. As a method of adhesion, a well known method by various kinds of adhesives, a well-known thermal bonding method, or the like may be used. In the present invention, adopting a adhesion method that does not use heat or a thermal bonding method under the temperature of 200° C. or less is preferable, since under condition of 200° C. or less the maintaining of high reflectance is possible even to the case that base film is made of resin composition containing aliphatic polyester-based resin as a main component, in that case base film may have micro voids. Meanwhile, in the reflection sheet of the present invention, the plastic base film, the adhesive layer and the anchor coating layer are the same as described above in the parts related to the adhesive film.

Hereinafter, examples of the present invention will be described in detail. The examples described below are only examples of the present invention, and the scope of the present invention will not be limited to the examples.

Example 1

1. Manufacturing Adhesive Film

An adhesive film for a reflection sheet is manufactured as described below. On one side of a PET film having a thickness of 50 μm (XU42, Toray Advance Materials Inc.) an anchor coating layer having a thickness of 0.5 μm is formed by performing pretreatment. The material used for anchor coating layer is a modified acrylic resin [poly(2-ethylhexyl methacrylate), Mw~123,000, Aldrich Inc.], and the pretreatment is performed by passing the PET film and the anchor coating layer through a coating device for a heat treatment in a heat oven at a temperature of 150° C. with a film running speed of 10 m/min. Then, coating 25 μm of an acrylic adhesive composition is applied on the other side of the film by a comma coating device, which contains 0.5 parts by weight of toluene diisocyanate with respect to 100 parts by weight of a (metha) acrylic copolymer [a copolymer obtained by mixing 70% by weight of n-butyl acrylate, 20% by weight of methyl acrylate, 5% by weight of acrylic acid, and 5% by weight of 2-hydroxy ethyl acrylate and injecting 100 parts by weight of ethyl acetate and 0.05 parts by weight of azobisisonitrile (AIBN) with respect to 100 parts by weight of the mixture], An adhesive layer is formed by drying the film in the heat oven at a temperature of 100° C. Finally, the adhesive film is manufactured by laminating a low release film (RPS-101, Toray Advance Materials Inc.) on the adhesive layer.

2. Manufacturing Reflection Sheet

A reflection sheet is manufactured by forming a reflection layer having a thickness of 0.2 μm in a method of coating nano silver ink (Advanced Nano Products Co.) on the surface of anchor coating layer of the manufactured adhesive film using a micro gravure coating device, at the heat oven temperature of 150 to 200° C. with a film running speed of 10 m/min.

Example 2

A reflection sheet is manufactured in the same manner as shown in example 1, except that in manufacturing the adhesive film, the anchor coating layer is formed by performing pretreatment on one side of the PET film with a polyester-based resin [poly(butylene terephthalate)-co-poly(alkyleneglycol terephthalate), Aldrich Inc.].

Example 3

A reflection sheet is manufactured in the same manner as shown in example 1, except that in manufacturing the adhesive film, the anchor coating layer is formed by performing pretreatment on one side of the PET film with a urethane-based resin [polyethylene adipate, tolylene 2,4-diisocyanate end group, number-average molecular weight ~2,700, 3 wt % isocyanate, Aldrich Inc.].

Example 4

A reflection sheet is manufactured in the same manner as shown in example 1, except that in manufacturing the adhesive film, the adhesive film is heat treated at 130° C.

Example 5

A reflection sheet is manufactured in the same manner as shown in example 1, except that in manufacturing the adhesive film, the adhesive film is heat treated at 180° C.

Comparative Example 1

A reflection sheet is manufactured in the same manner as shown in example 1, except that in manufacturing the adhesive film, the adhesive film is heat treated at 90° C.

Comparative Example 2

A reflection sheet is manufactured in the same manner as shown in example 1, except that in manufacturing the adhesive film, the adhesive film is heat treated at 190° C.

Comparative Example 3

A reflection sheet is manufactured in the same manner as shown in example 1, except that in manufacturing the adhesive film, heat treatment is not performed.

<Test>

Peeling strength, aging stability, anti-transferability, thermal deformation, shrinkage, and coatability of reflection coating are measured for the adhesive films manufactured in the examples and comparative examples described above, and the results are summarized in Table 1.

1. Measuring Peeling Strength

From reflection sheet, the release film on the adhesive film is removed, and then is cut into a piece of one by one inch. The piece of the adhesive film is attached to a non-alkaline glass plate by reciprocating a roller of 2 Kg one time, autoclave-processed at 50° C. with 0.5 MPa for 30 minutes, and then put aside at room temperature for two hours. Then, 180° peeling strength is measured using Instron measuring equipment at 300 mm/min speed.

2. Measuring Aging Stability

The glass plate attached on the adhesive film is put aside at room temperature for six months, and change of adhesive force over time with respect to curing time is measured with naked eyes. Change of the adhesive force is expressed as X (bad) if the change is severe, Δ (average) if the change is a little bit severe, ○ (good) if the change is almost none, and ⊚ (best) if the change is none.

3. Measuring Anti-Transferability

After attaching the reflection sheet to the glass plate in the method described above, the adhesive film is released from the glass plate, and the degree of transferability of the adhesive remaining on the glass plate is measured with naked eyes. The degree of transferability of the adhesive is expressed as X (bad) if the remaining adhesive is much, Δ (average) if the remaining adhesive is a little, ○ (good) if the remaining adhesive is almost none, and ⊚ (best) if the remaining adhesive is none at all.

4. Measuring Thermal Deformation

When 100 hours are elapsed after putting the glass plate attached with the adhesive film into an air circulation oven of 150°, the degree of deformation is measured with naked eyes. The degree of deformation is expressed as X (bad) if the deformation is severe and the adhesive film is partially released from the glass plate, Δ (average) if deformation is partially occurred but the adhesive film is not released from the glass plate, ○ (good) if deformation is almost none, and ⊚ (best) if deformation is none at all.

5. Measuring Shrinkage

The adhesive film is cut into a piece of 200×10 mm in the machine and transverse directions. The piece of the adhesive film is put into an air circulation oven and heat-treated for 30 minutes at 150° C. or for 10 minutes at 200° C. Then, the piece of the adhesive sheet is taken out of the oven and then put aside at room temperature for two hours, and change of length is measured. Heat shrinkage is quantified as shown in the mathematical expression shown below.

$$[(Lo-L)/Lo]\times 100 = \text{Heat shrinkage (\%)}$$

(Lo: length before heat treatment, L: length after heat treatment)

6. Measuring Coatability

The coated surface of the reflection sheet is measured using an optical microscope, and unevenness of coatability is measured. The unevenness of the coatability is expressed as X (bad) if coatability changes severely, Δ (average) if coatability changes a little bit severely, ○ (good) if coatability is almost unchanged, and ◉ (best) if coatability is unchanged.

7. Measuring Dynamic Storage Modulus

After removing the release film from the reflection sheet, a dynamic storage modulus is measured using a viscometer (ARES, Rheometric Scientific).

8. Measuring Thickness Deviation

Thickness deviation of the reflection sheet is measured at a processing speed of 1,500 mm/min using film thickness measuring equipment of Anritsu.

TABLE 1

| cases | | | Example 1 | Example 2 | Example 3 | Example 4 | Example 5 | Comparative example 1 | Comparative example 2 | Comparative example 3 |
|---|---|---|---|---|---|---|---|---|---|---|
| Heat shrinkage | | | | | | | | | | |
| (%) | 150° C. | Vertical | 0.39 | 0.36 | 0.36 | 0.48 | 0.29 | 1.07 | 0.21 | 0.42 |
| (%) | 150° C. | Horizontal | 0.28 | 0.29 | 0.29 | 0.36 | 0.24 | 0.68 | 0.19 | 0.27 |
| (%) | 200° C. | Vertical | 0.51 | 0.46 | 0.48 | 0.57 | 0.42 | 1.13 | 0.37 | 0.60 |
| (%) | 200° C. | Horizontal | 0.40 | 0.34 | 0.37 | 0.41 | 0.29 | 0.84 | 0.23 | 0.42 |
| Peeling strength | | | 13.8 | 12.9 | 13.5 | 13.2 | 12.4 | 14.2 | 11.9 | 12.5 |
| Thickness deviation (μm) | | | 1.2 | 1.6 | 1.4 | 1.1 | 1.9 | 1.4 | 2.5 | 1.3 |
| G' @ 0.1 rad/s (MPa) | | | 0.82 | 0.73 | 0.91 | 0.82 | 0.65 | 0.69 | 0.71 | 0.85 |
| Aging stability | | | ◉ | ◉ | ◉ | ◉ | ◉ | ○ | ○ | ◉ |
| Anti-Transferability | | | ◉ | ◉ | ◉ | ◉ | ◉ | ○ | ○ | ◉ |
| Thermal deformation | | | ◉ | ◉ | ◉ | ◉ | ◉ | X | ○ | ◉ |
| Coatability | | | ◉ | ◉ | ◉ | ◉ | ◉ | Δ | X | X |

Referring to Table 1, heat shrinkage and thermal deformation are superior in the case where the heat treated plastic film is applied, and physical properties such as aging stability, anti-transferability, and coatability are superior in examples 1 to 4 in which an adhesive composition containing an optimum amount of hardener is applied.

On the other hand, in the case where the heat treatment is not performed or heat treatment temperature is low, heat shrinkage and coatability are lowered. In the case where the heat treatment temperature is too high, thickness deviation of the base film increases, and migrations of materials such as oligomer, particles and the like from inside to the surface of the base film appeared, and thus coatability is lowered when anchor coating is performed. In addition, in the case of comparative example 3 in which a base without an anchor coating layer, adhesive properties such as heat shrinkage, aging stability and anti-transferability are satisfactory, but reflective coatability is unfavorable.

As a summary, if the adhesive film is processed into the reflection sheet and exposed to a high temperature for an long time after being attached to a backlight unit, difference in reflectance or the like may be induced as the reflection sheet is bent, and thus, in order to use the adhesive film as a part of reflection sheet, shrinkage of the base film should be controlled to the range of present invention and flatness of the base film should be controlled for the reflection coating process.

The adhesive film for a reflection sheet of the present invention is manufactured by applying an adhesive composition on a plastic base film where heat shrinkage is controlled, and thus the adhesive film has superior dimensional stability at a high temperature and excellent workability in a post process for laminating a reflection layer. Therefore, partial detachment of adhesive layer does not occur after releasing, and stable physical properties can be achieved.

Furthermore, the adhesive film for a reflection sheet of the present invention can be attached to an adherent through a simple lamination process without a curing process after a post process for laminating a reflection layer is performed on the back side of a base film, and then the adhesive film can be released and reattached easily. Therefore, the process of manufacturing a backlight unit is simplified, and manufacturing costs may be reduced. In addition, it is advantageous in that even after the adhesive film is laminated on the adherent, high temperature reliability is superior, and deformation of the base film is reduced.

The adhesive film for a reflection sheet of the present invention may be used as a sheet, a film, a label, a tape or the like in all kinds of industries including display and packaging, construction and civil engineering, automobile, and the like. In addition, even in the display optical films and semiconductor sectors, the adhesive film can be used as an adhesive film for advanced processing.

While the present invention has been described with reference to the particular illustrative examples, it is not to be restricted by the examples but only by the appended claims. It is to be appreciated that those skilled in the art can change or modify the examples without departing from the scope and spirit of the present invention.

We claim:

1. An adhesive film for a reflection sheet, comprising:
a polyethyleneterephthalate base film heat-treated at a temperature between 130 to 180° C., having a heat shrinkage of −0.1 to 0.5% at 150° C. in a machine direction and a transverse direction, and a thickness deviation less than 2.0 μm;
an adhesive layer formed on one side of the base film by applying an adhesive composition; and
an anchor coating layer formed on the other side of the base film, opposite to the side on which the adhesive layer is formed.

2. The adhesive film according to claim 1, wherein the adhesive layer is formed by applying one or more adhesives selected from the group consisting of silicon-based resin and acrylic resin.

3. The adhesive film according to claim 1, wherein a dynamic storage modulus of the adhesive layer is $10^5$ to $10^7$ Pa.

4. The adhesive film according to claim 1, wherein the anchor coating layer comprises a resin composition containing one or more selected from the group consisting of amino-based resin, aminoalkyd-based resin, acrylic resin, styrenic resin, acryl-styrenic copolymer, polyester-based resin, vinyl chloride-based resin, polyvinyl acetate-based resin, polyvinyl butyral, urethane-based resin, urea-based resin, melamine-based resin, urea-melamine-based resin, epoxy-based resin, fluoro-polymer resin, polycarbonate, nitrocellulose, cellulose acetate, alkyd-based resin, rosin modified maleic acid resin, and polyamide-based resin.

5. A reflection sheet comprising:
- a polyethyleneterephthalate base film heat-treated at a temperature between 130 to 180° C., having a heat shrinkage of −0.1 to 0.5% at 150° C. in a machine direction and a transverse direction, and a thickness deviation less than 2.0 μm;
- an adhesive layer formed on one side of the base film by applying an adhesive composition;
- an anchor coating layer formed on the other side of the base film, opposite to the side on which the adhesive layer is formed; and
- a metal thin film layer formed on the anchor coating layer.

6. The sheet according to claim 5, wherein the anchor coating layer is formed of a resin composition containing one or more selected from the group consisting of amino-based resin, aminoalkyd-based resin, acrylic resin, styrenic resin, acryl-styrenic copolymer, polyester-based resin, vinyl chloride-based resin, polyvinyl acetate-based resin, polyvinyl butyral, urethane-based resin, urea-based resin, melamine-based resin, urea-melamine-based resin, epoxy-based resin, fluoro-polymer resin, polycarbonate, nitrocellulose, cellulose acetate, alkyd-based resin, rosin modified maleic acid resin, and polyamide-based resin.

* * * * *